United States Patent [19]

Marx et al.

[11] Patent Number: 4,527,391
[45] Date of Patent: Jul. 9, 1985

[54] THRUST REVERSER

[75] Inventors: Jon A. Marx; Wendell R. Loso, both of Manchester, Conn.

[73] Assignee: United Technologies Corporation, Hartford, Conn.

[21] Appl. No.: 431,474

[22] Filed: Sep. 30, 1982

[51] Int. Cl.³ .............................................. F02K 1/62
[52] U.S. Cl. ............................ 60/226.2; 239/265.29; 239/265.31; 244/110 B; 74/110
[58] Field of Search .............. 60/226.2, 230, 262; 239/265.19, 265.25, 265.29, 265.31; 244/110 B; 74/110, 422

[56] References Cited

U.S. PATENT DOCUMENTS

| 2,088,504 | 7/1937 | Brzezinski | 74/30 |
| 2,355,452 | 8/1944 | Linkowski | 74/110 X |
| 3,500,645 | 3/1970 | Hom | 60/226.2 |
| 3,500,646 | 3/1970 | Hom et al. | 60/226.2 |
| 4,147,028 | 4/1979 | Rodgers | 239/265.31 |
| 4,177,639 | 12/1979 | Taylor | 60/226.2 |
| 4,356,973 | 11/1982 | Lawson | 60/226.2 |
| 4,407,120 | 10/1983 | Timms | 60/226.2 |

FOREIGN PATENT DOCUMENTS 1360238  7/1974  United Kingdom ............... 60/226.2

Primary Examiner—Louis J. Casaregola
Assistant Examiner—Jeffrey A. Simenauer
Attorney, Agent, or Firm—Norman Friedland

[57] ABSTRACT

For a long dual mixer nacelle housing a fan-jet engine powering aircraft, a pair of concentric sleeves sandwiching the cascades to effectuate thrust reversal are synchronously deployed axially to communicate the fan discharge air in the duct with ambient through the cascades. A rack and gear connection between sleeves permits the independent linear motion of each of the sleeves so that the actuation of one automatically actuates the other without the necessity of attaching both to each other.

2 Claims, 4 Drawing Figures

THRUST REVERSER

DESCRIPTION

1. Technical Field

This invention relates to nacelles for housing fan-jet engines powering aircraft and particularly to the thrust reverser mechanism in a long duct type.

2. Background Art

As is well known, the nacelle of the aircraft typically carries thrust reversing cascades that are covered to provide an aerodynamically clean surface for the aircraft. Upon thrust reversal the skin adjacent the cascade is moved rectilinearly to expose the cascade to ambient to permit the flow of fan discharge air through the cascade which serves to reverse the flow and hence induce a reverse thrust load. In the short duct installation the cylindrical skin portion constituting the entire aft body of the nacelle is displaced axially by suitable actuating mechanism such as a ball-screw actuator. Blocked doors are synchronously deployed to prevent the air from escaping rearwardly toward the tailpipe.

However, in a long duct nacelle, that is a nacelle that spans the entire engine and defines a mixing area for the core gases and the fan discharge air, the extended length complicates the displacement of the aft body. In some installations the size of the actuator necessary to move that portion of the nacelle wound render its use prohibitive.

We have found that we can provide a system for exposing the cascade by providing a pair of radially spaced concentric cylindrical sleeves sandwiching the cascades and utilizing a rack and pinion gear connection between both sleeves such that the independent activation of one sleeve will move the other sleeve. Such an arrangement allows both sleeves to move at different speeds if such is desired, and/or moves the sleeve in the same or opposite directions without introducing any additional complexity to the system.

DISCLOSURE OF INVENTION

An object of this invention is to provide for a long duct nacelle an improved thrust reverser. A feature of this invention is to include a pair of concentric spaced cylindrical panels sandwiching the thrust reversing fixed cascade where one panel is positioned by an activation and the other is positioned by a gear assembly driven by said positioned panel.

Other features and advantages will be apparent from the specification and claims and from the accompanying drawings which illustrate an embodiment of the invention.

BEST MODE FOR CARRYING OUT THE INVENTION

For the purpose of describing this invention, the term long mixing duct nacelle refers to the nacelle that extends beyond the end of the fan/jet engine being housed thereby so that the fan discharge air and engine core gases mix within the nacelle's tailpipe section. This is in contrast to a short duct nacelle that typically terminates downstream of the fan discharge section and upstream of the engine's tailpipe section.

Figure 1:
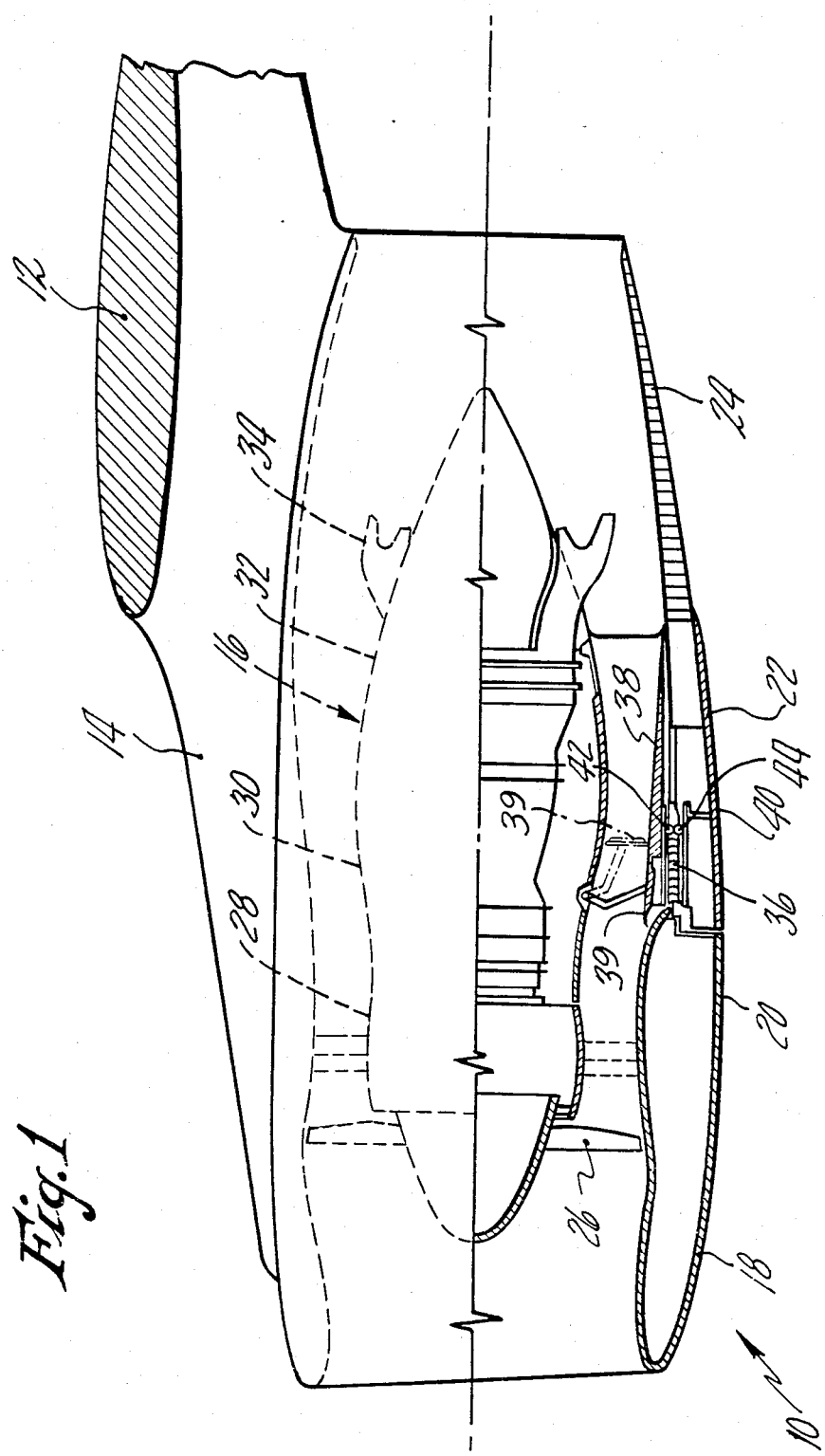
FIG. 1 is a fragmentary view, partly in section, partly in elevation and schematic illustrating the invention as mounted in a nacelle supported under the aircraft's wing.

As can be seen in FIG. 1, the nacelle generally illustrated by reference numeral 10 is suitably attached to the wing 12 (partially shown) by pylon 14 and houses the fan/jet engine 16. Essentially the nacelle comprises the inlet section 18, the fan cowl doors 20, fan duct reverser section 22, and the tailpipe section 24. The engine which is of the JT9D type manufactured by Pratt & Whitney Aircraft, a division of United Technologies Corporation, the assignee of this patent application comprises the fan section 26, the compressor section 28, the burner section 30, the turbine section 34, and the mixing section 34.

Typically, the core discharge air is mixed with the fan discharge air in the tailpipe section 24. For further details of the engine, reference should be made to the JT9D engine supra. As will be appreciated, this invention is primarily concerned with the thrust reversal aspects of this type of installation and for the sake of convenience and simplicity the description herein will only deal with this aspect.

As shown in FIG. 1, the cascade 36 is sandwiched between the concentric cylindrical sleeve panels 38 and 40 that form the inner and outer contour of the nacelle when in the nonoperating position. Upon deployment, the sleeves are translated rearwardly to expose the cascade to the fan discharge air and ambient. Suitable blocker doors 39 which are typical in the art are also deployed blocking the rearward moving fan discharge air so that it is diverted through the cascade. The cascade comprises a plurality of turning vanes that reverse the flow of the air discharging therefrom into ambient to develop a reversing momentum to impede the velocity of the aircraft.

Figure 2:
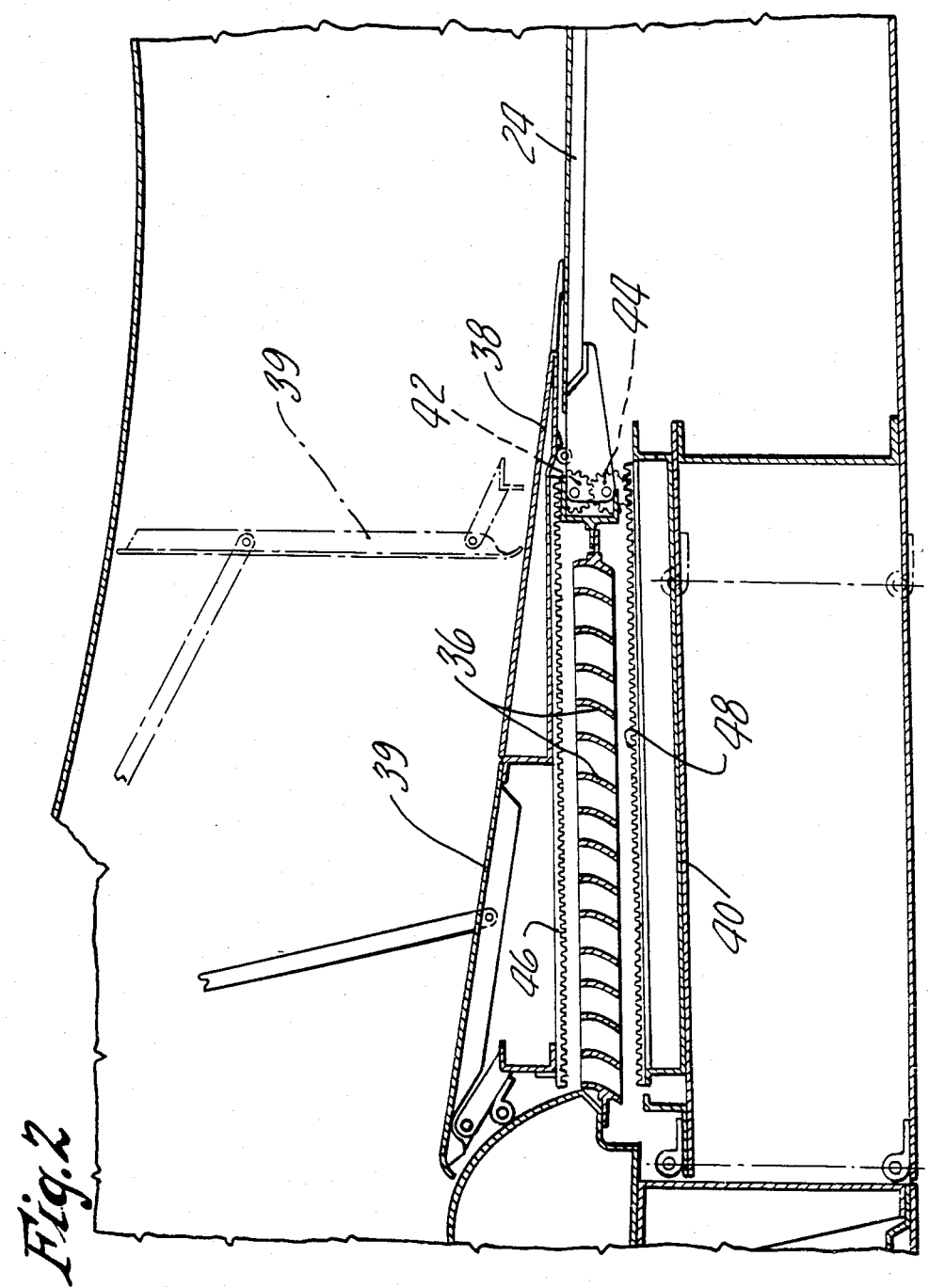
FIG. 2 is a partial view, partly in section and schematic illustrating the details of the invention.
Figure 3:
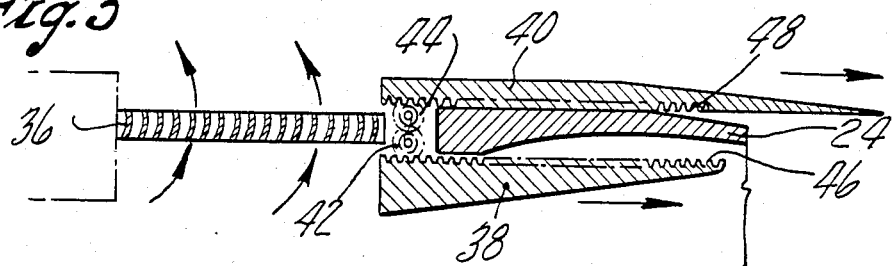
FIG. 3 is a partial view in schematic showing the nacelle panels in both the open and closed position.
Figure 4:
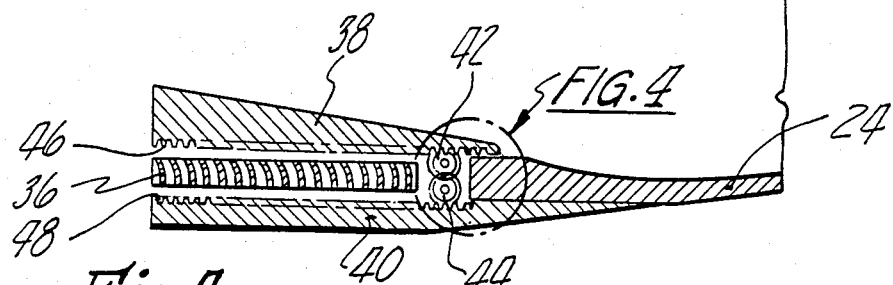
FIG. 4 is an enlarged view taken within the encircle section 4—4 illustrating the gear connection of the two panels.
Figure 4:
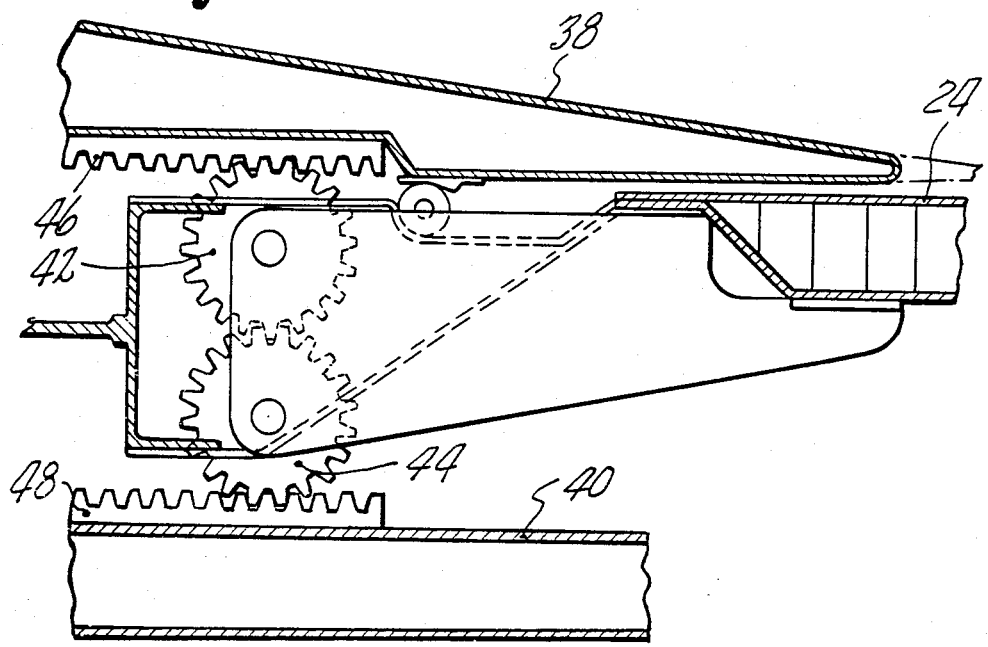

According to this invention, as noted in FIGS. 2, 3 and 4, the only connection between the inner sleeve 38 and outer sleeve 40 is through the pinion gears 42 and 44 which engage rack gears 46 and 48 mounted on and movable with the inner and outer sleeves 38 and 40, respectively. In order to deploy the sleeves, a suitable actuator (not shown) such as a ball screw type that is typically used, moves the inner sleeve 38 rearwardly causing rack gear 46 to translate, rotating the meshed gear 42 which in turn rotates the companion gear 44 and translates rack gear 48 in the same direction. The invention contemplates translating the sleeves in opposite directions if such is desirable in any particular installation which could easily be done by including another gear or removing one gear in the train. It may also be desirable to expose the areas of the inner and outer sleeves that see the cascade at a given area ratio which can be accomplished by selecting the appropriate gear ratio.

It should be understood that the invention is not limited to the particular embodiments shown and described herein, but that various changes and modifications may be made without departing from the spirit and scope of this novel concept as defined by the following claims.

I claim:

1. A nacelle in combination with a fan-jet engine for powering an aircraft having a casing, said fan jet engine completely disposed within said nacelle, said nacelle comprising a generally cylindrically shaped hollow wall surrounding said engine and being spaced therefrom for defining with said casing an annular passage for conducting fan air to discharge downstream of the engine relative to the flow of engine fluid working medium, the annular passage having an inlet spaced upstream from said engine and an exit spaced downstream from said engine, flow reversing means interposed intermediate said inlet and said outlet for leading air in said annular passage to ambient bypassing said exit, said flow reversing means including a cascade, a pair of spaced concentric slidable sleeves sandwiching said cascade, one of said sleeves being moveable rectilinearly and means including a pair of mating gears and a pair of cooperating racks, each of said cooperating racks attached to a respective sleeve and each of said racks engaging one of said respective gears so that the other said gears is rotated to position its respective rack so that the other of said sleeves is positioned by the rectilinear movement of said one of said sleeves whereby both sleeves expose said cascade to ambient, whereby both sleeves are deployed in the same direction.

2. A nacelle as in claim 1 wherein the area ratio exposed by the pair of sleeves are at a predetermined value and the number of teeth for each of said pair of gears are selected to produce a given gear ratio to produce said predetermined area ratio.

* * * * *

UNITED STATES PATENT AND TRADEMARK OFFICE
CERTIFICATE OF CORRECTION

PATENT NO. : 4,527,391

DATED : July 9, 1985

INVENTOR(S) : Jon A. Marx & Wendell R. Loso

It is certified that error appears in the above-identified patent and that said Letters Patent is hereby corrected as shown below:

Column 2, line 22, "34" should be --32--.

Signed and Sealed this

First Day of October 1985

[SEAL]

Attest:

DONALD J. QUIGG

Attesting Officer

Commissioner of Patents and
Trademarks—Designate